United States Patent [19]

Desprez et al.

[11] 4,307,985

[45] Dec. 29, 1981

[54] AUTOMOBILE TRANSPORTING PALLET

[75] Inventors: Barry L. Desprez, Sandy; Clarence E. Strayhorn; James K. Allred, both of Salt Lake City; Edward B. Quinn, Bountiful, all of Utah

[73] Assignee: Eaton-Kenway Inc., Bountiful, Utah

[21] Appl. No.: 91,222

[22] Filed: Nov. 6, 1979

Related U.S. Application Data

[63] Continuation-in-part of Ser. No. 20,783, Mar. 15, 1979.

[51] Int. Cl.³ .................. A47G 29/00; B60P 3/06; B65D 19/00; B65D 19/44
[52] U.S. Cl. .................. 410/46; 108/55.1; 206/386; 248/346; 410/9; 410/16; 410/19; 410/30; 410/49; 414/234
[58] Field of Search .......... 410/9, 16, 19, 30, 34, 410/49, 50, 44, 45, 46; 108/55.1; 206/335, 386; 248/346; 414/233, 234, 239, 240, 264

[56] References Cited

U.S. PATENT DOCUMENTS

| | | | |
|---|---|---|---|
| 1,229,714 | 6/1917 | Clark et al. | 410/19 X |
| 1,247,553 | 11/1917 | Linquist | 410/16 X |
| 2,521,088 | 9/1950 | Phelps | 410/19 X |
| 2,722,322 | 11/1955 | Gunderson | 414/229 |
| 2,824,654 | 2/1958 | Baume | 414/240 |
| 3,079,015 | 2/1963 | Sinclair | 414/239 |
| 3,110,466 | 11/1963 | O'Sullivan | 410/30 |
| 3,178,216 | 4/1965 | Huber | 108/55.1 |
| 3,221,907 | 12/1965 | O'Sullivan | 410/30 X |
| 3,830,404 | 8/1974 | Frazer | 222/78 |

Primary Examiner—Joseph F. Peters, Jr.
Assistant Examiner—Howard Beltran
Attorney, Agent, or Firm—H. Ross Workman; Rick D. Nydegger

[57] ABSTRACT

An automobile transportation and storage pallet used in automated storage and retrieval systems. The pallet is provided with steel tire channels connected and supported by a plurality of steel support members. Safety grip strips applied to the tire channels provide tire traction thereon. A corrugated drip pan interposed between the tire channels collects any drippings from the automobile. Tire blocks adjustably mounted to the tire channels secure the tires of the automobile resulting in proper alignment of the automobile with respect to the pallet and preventing movement of the automobile thereon. The tire blocks can be adjusted to conform to any size of tire and wheel base.

2 Claims, 4 Drawing Figures

AUTOMOBILE TRANSPORTING PALLET

RELATED APPLICATION

This Application is a continuation in part of copending application Ser. No. 20,783 filed Mar. 15, 1979.

BACKGROUND

1. Field of the Invention

The present invention relates to transportation and storage pallets and in particular to a transportation and storage pallet for automobiles to be used in an automated storage and retrieval system.

2. The Prior Art

Automated storage and retrieval systems for palletized goods are well known in the field of materials handling. Such systems permit large quantities of goods to be automatically stacked and stored in large high-rise bins. Computerized inventory control and computer controlled movement of goods into and out of the storage bins has resulted in major cost savings in a variety of applications. Thus, automated materials handling systems are increasingly being used, even for such large scale projects as warehousing automobiles.

However, as described in co-pending application Ser. No. 20,783, filed Mar. 15, 1979, herein incorporated by reference, some difficulties have been experienced in automated storage and retrieval systems designed for automobile warehousing. For example, each automobile must be transported within the storage system on a pallet. The pallets must be matched to correspond to the tire size and length of each car, thus necessitating use of many different sizes of pallets and causing some delay and inefficiency in the automated system.

Problems have also been encountered in securing the automobiles to their pallets. During transportation, bad alignment and movement of the automobiles on their pallets may cause the automated system to be shut down while the automobile is re-aligned and re-secured on its pallet in order to prevent it from slipping or rolling off the pallet as it is moved or hoisted. This of course causes further inefficiency and delay in the automated system.

Another problem arises when the automobiles are stored in the high-rise storage racks. The stored automobiles drip oil, grease and other fluids onto the automobiles below, thus creating an undesirable situation.

Thus, what is needed is an improved pallet for transporting and storing automobiles in an automated storage and retrieval system. The pallet should be adjustable to accommodate different sizes of automobiles and should maintain proper alignment of the automobile in order to prevent movement thereof during transportation. The pallet should also be designed to protect other automobiles stored below in the storage rack from drippage. Such an invention is illustrated and described herein.

BRIEF SUMMARY AND OBJECTS OF THE INVENTION

The automobile transportation and storage pallet of the present invention is designed for use in automated storage and retrieval systems, but can be used in any system for transporting or storing automobiles.

The pallet includes steel tire channels connected and supported by support members. An automobile is driven onto the pallet so that the tires follow the tire channels. Safety grip strips are applied to the tire channels to provide additional traction. A drip pan placed between the tire channels collects drippings from the automobile. Tire blocks mounted to the tire channels provide a tire pocket for aligning and securing the tires and preventing movement of the automobile during transportation. The tire blocks can be adjusted to conform to any size of tire and wheel base so that all sizes of automobiles may be transported and stored in the automated warehousing system.

It is therefore a primary object of the present invention to provide an improved pallet for transporting and storing automobiles in an automated storage and retrieval system.

Another important object of the present invention is to provide an automobile pallet for use in an automated storage and retrieval system wherein the pallet may be adjusted for use with varying sizes of automobiles.

Yet another important object of the present invention is to provide an automobile pallet for use in automated storage and retrieval systems which will maintain proper alignment of the automobile with respect to the pallet so as to prevent movement of the automobile during transportation.

Still another object of the present invention is to provide an automobile pallet for use in automated storage and retrieval systems that collects drippage from the automobile stored thereon to protect other automobiles stored in the high-rise storage rack.

These and other objects and features of the present invention will become more fully apparent from the following description and appended claims taken in conjunction with the accompanying drawing.

DETAILED DESCRIPTION OF THE PREFERRED EMBODIMENTS

Figure 1:
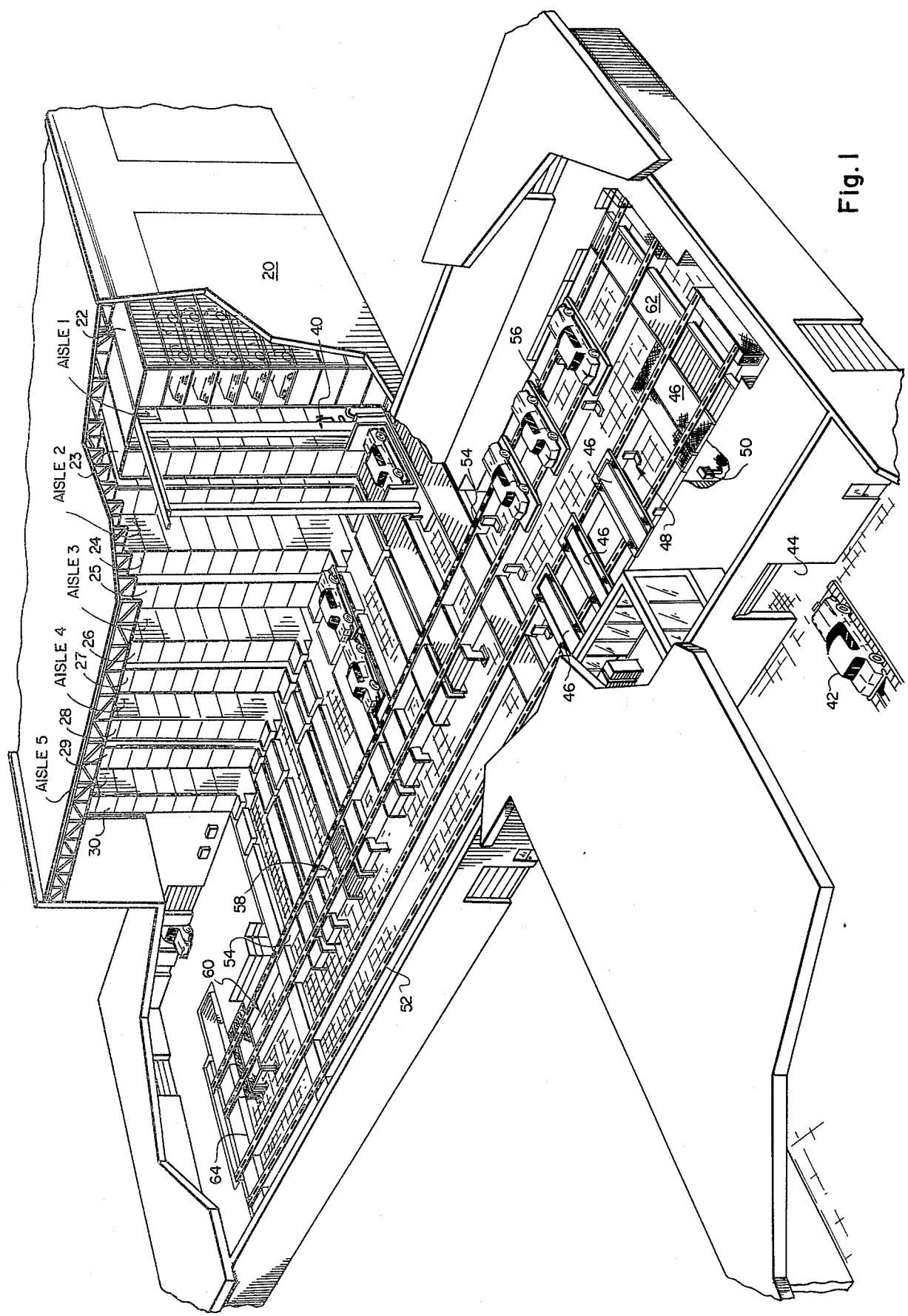
FIG. 1 shows the pallet of the present invention as used in an automated storage and retrieval system for automobiles.

Reference is now made to the drawing wherein like parts are designated with like numerals throughout.

1. The Overall System of FIG. 1

The automobile transportation and storage pallet of the present invention is designed for use in transporting and storing automobiles in automated storage and retrieval systems, although it can be used in any system for transporting or storing automobiles. Such an automated system is generally illustrated in FIG. 1.

As shown in FIG. 1, a high-rise storage warehouse 20 comprises an array of storage bays 22–30. The storage bays 22–30 are separated by parallel aisles 1–5. The storage bin assemblies 22–30 are typically constructed of metal rack which open into the corresponding aisles 1–5. Each aisle is provided with a computer controlled storage/retrieval (S/R) machine 40, only one of which is illustrated in FIG. 1.

Automobiles, e.g. 42, fresh from the assembly line enter the system at 44 and are driven onto a pallet 46, described in more detail below. The pallet 46 has been previously placed in the pallet queue generally designated 48. The pallet queue 48 is part of an elongated, essentially continuous conveyor 52 which runs essentially perpendicular to aisles 1–5. Conveyor 52 is preferably a chain-driven conveyor. When the pallets 46 reach the pallet queue area 48, air-driven pop-up sections (not shown) raise the pallets 46 off the moving chains and hold the pallets in the queued position for on-loading.

The high rise storage system is also provided with a second essentially continuous conveyor 54, conveyor 54 running essentially parallel to conveyor 52 and being similarly generally perpendicular to aisles 1–5. Conveyor 54 is preferably a chain-driven conveyor. Conveyor 54 is divided into three sections identified from right to left of FIG. 1 as the input queue 56, transfer area 58 and output queue 60. Conveyor 52 and conveyor 54 are connected at the input end by conveyor 62 and at the output end by conveyor 64. Conveyors 62 and 64 are preferably chain-driven line roller conveyors.

It is pointed out that all of the queue areas including the empty pallet queue 48, the input queue 56 and the output queue 60 are provided with conventional air-driven pop-up sections that raise the pallets 46 off the moving chains until de-energized, whereupon the pallets 46 are placed back on the moving chains for displacement by the conveyor.

The automobile 42 is placed on the pallet 46 and a description thereof entered at the computer terminal 50. After the automobile has been driven onto pallet 46, the driver presses a button at terminal 50 which releases the palletized automobile to the input conveyor system under direction of the control system in the CPU (not shown).

Thereafter, the palletized automobile may be transported for storage or subsequent retrieval by the computer controlled conveyors 52, 54 and S/R Machine 40.

2. The Embodiment of FIGS. 2–4

Figure 2:
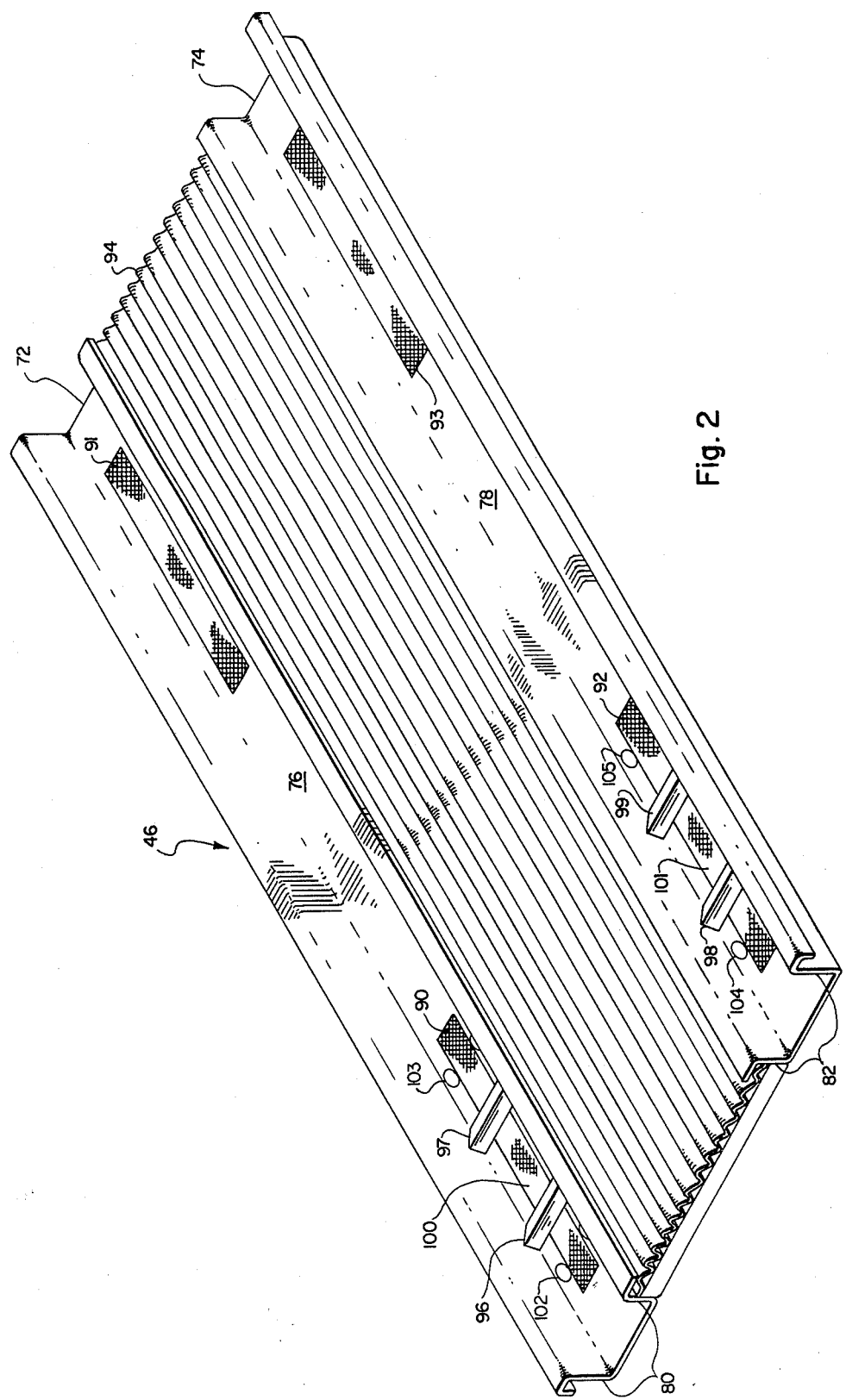
FIG. 2 is a perspective view of the car transportation pallet of the present invention.
Figure 3:
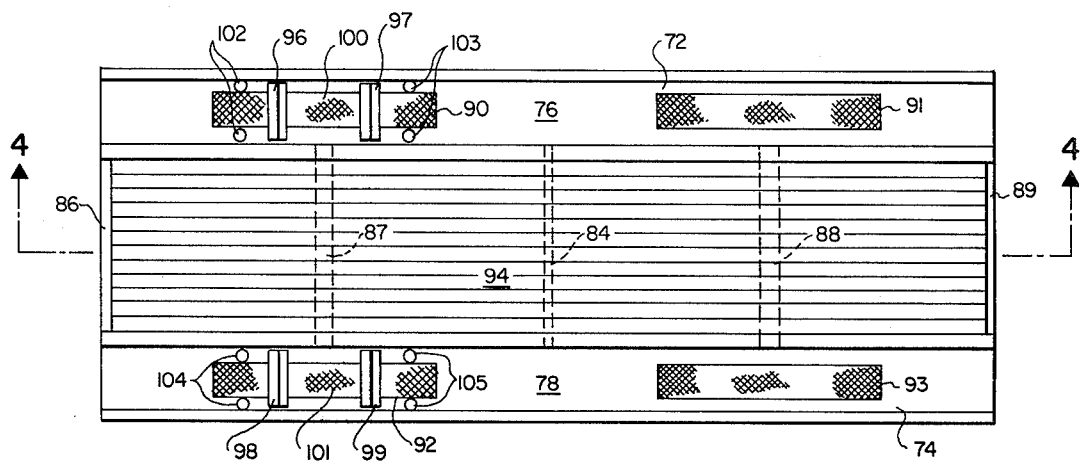
FIG. 3 is a top plan view of the pallet of FIG. 2.
Figure 4:
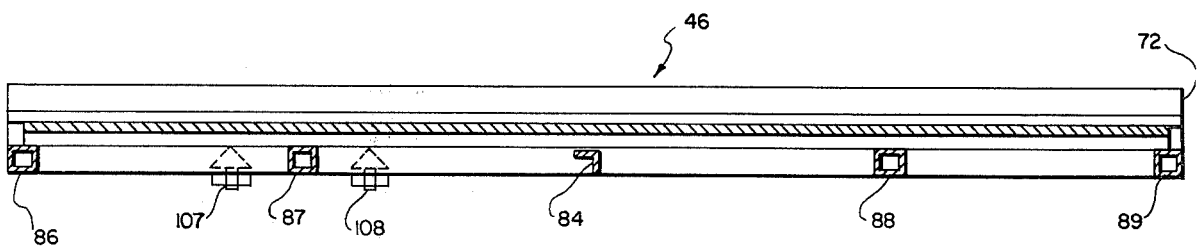
FIG. 4 is a cross-sectional view of the pallet of FIG. 3, taken along cutting plane line 4—4.

As illustrated in FIGS. 2 and 3, the pallet generally designated 46 comprises two elongated steel tire channels 72 and 74. The steel used should be of sufficient strength to support the weight of an automobile, such as 7 GA plate steel. Each tire channel 72, 74 provides a driving surface 76, 78 for the tires of an automobile, and are formed with side walls 80, 82 to keep the tires within tire channels 72, 74. Angular steel support member 84 (see FIGS. 3 and 4) is welded between tire channels 72 and 74 at the centerline of pallet 46. Support member 84 connects tire channels 72 and 74 and provides support for the pallet structure 46. Four supplementary support members 86–89 (FIGS. 3 and 4) are made of tubular steel and are also welded between tire channels 72 and 74, being spaced as shown. Supplementary support members 86–89 provide additional stability and strength to the pallet 46 and result in minimal deflection of pallet 46 while transporting automobiles.

As further shown in FIGS. 2 and 3, each tire channel 72, 74 is provided with two safety grip strips 90–91, 92–93. Strips 90–93 may be, for example, 16 GA "Morton" tread grip safety flooring strips. It will be appreciated that any rough-textured material may be used in lieu of the safety grip strips here shown. Safety grip strips 90–93 are applied to the driving surface 76, 78 of tire channels 72, 74 so as to provide better tire traction while driving an automobile onto and off of pallet 46.

Corrugated drip pan 94 is welded between tire channels 72 and 74 and is welded to support member 84 and supplementary support members 86–89. Drip pan 94 extends the entire length of tire channels 72 and 74. The corrugations of drip pan 94 prevent the fluid from running across the pallet 46 and spilling over the side of the pan 94 during movement. Drip pan 94 thus provides complete protection by preventing fluids from dripping upon other automobiles stored in the high-rise rack structure 20 (See FIG. 1). Drip pan 94 can be constructed from 22 GA corrugated sheet metal or other suitable corrugated material.

Referring again to FIGS. 2 and 3, two angular steel tire blocks 96–97, 98–99 are mounted to each tire channel 72, 74. Tire blocks 96–99 form tire pockets 100, 101 into which the automobile tires are advanced. Tire pockets 100, 101 are positioned so as to prevent movement of the tires, thus retaining the automobile in proper alignment with respect to pallet 46 during transportation to and from the storage structure.

Tire pockets 100, 101 may be positioned along the length of tire channels 72, 74 so as to accommodate any given size of tire and wheel base. For example, tire blocks 95–99 may be positioned so as to correspond to any of the sets of holes 102–105 (see FIG 3), and thereafter bolted in place by bolts 107–108 (see FIG. 4). In this way, pallet 46 may be adjusted to handle various automobile sizes. It will of course be appreciated that tire blocks 96–99 may be positioned and thereafter secured in place by any suitable method, as for example by placing the ends of the tire blocks in slots, or by welding the tire blocks once they are positioned.

The manner of using the automobile transportation and storage pallet will be readily apparent to those of ordinary skill in the art. An operator drives an automobile so that the tires are aligned with tire channels 72, 74 as the automobile approaches pallet 46. The automobile is then driven onto pallet 46 with the tires moving along the tire channels 72, 74 with safety grip strips 90–93 providing better traction. The front tires of the automobile (or back tires if the automobile is being backed in) are then made to pass over the first of tire blocks 96–99 in tire channels 72 and 74 so that the tires settle into tire pockets 100, 101. The automobile is then stopped and the engine turned off, and the automobile is then ready to be transported on the pallet 46 by conveyors 52, 54 ans S/R machine 40 (see FIG. 1) and stored in the storage rack 20. Tire blocks 96–99 are repositioned in accordance with a given wheel base size and tire size and then bolted or otherwise secured in place prior to driving the automobile onto the pallet 46. In this way, tire pockets 100, 101 may be adjusted to fit any size of tire so as to prevent movement thereof and so as to insure proper alignment of the automobile with respect to pallet 46. Once stored, drip pane 94 collects drippings from the automobile to prevent spillage upon other automobiles stored in the rack structure 20.

The invention may be embodied in other specific forms without departing from its spirit or essential characteristics. The described embodiments are to be considered in all respects only as illustrative and not restrictive and the scope of the invention is, therefore, indicated by the appended claims rather than by the foregoing description. All changes which come within the meaning and range of equivalency of the claims are to be embraced within their scope.

What is claimed and desired to be secured by United States Letters Patent is:

1. A transportable automobile pallet for use in transporting and storing automobiles in an automated storage system comprising:
    a pair of tire channels, each said channel having a driving surface for the tires of said automobile, a pair of side walls for maintaining the tires of said automobile within said tire channels and a plurality of longitudinally spaced apertures in said driving surface;

a plurality of support members between and interconnecting said tire channels;

a corrugated drip pan having ends and sides interposed between said tire channels and supported on said support members so as to collect fluids dripping from said automobile and to prevent fluids from running laterally across said pallet and spilling over the sides thereof while transporting said pallet to and from storage; and a plurality of tire blocks adjustably mounted on each said tire channel, each said tire block having at least one bolt configurated to engage said apertures in said tire channel to rigidly secure each said tire block to said tire channel in at least one of a plurality of positions so as to fit a given size of tire and wheel base in order to hold said automobile while transporting said pallet.

2. A pallet as defined in claim 1 further comprising safety grip treads applied to each said tire channel.

* * * * *